United States Patent [19]

McMillan

[11] 3,750,503
[45] Aug. 7, 1973

[54] METHOD AND MEANS OF GANG SAW LUBRICATION AND COOLING

[76] Inventor: James R. McMillan, Box 17, Lone Butte, British Columbia, Canada

[22] Filed: May 4, 1971

[21] Appl. No.: 140,232

[30] Foreign Application Priority Data
May 6, 1970 Great Britain............. 21,703/70
Nov. 26, 1970 Great Britain............. 56,546/70

[52] U.S. Cl............... 83/16, 83/169, 83/171, 83/425.4
[51] Int. Cl............................................ B26d 7/08
[58] Field of Search.............. 143/157 R, 157 C, 143/164, 158; 83/168, 169, 171, 16, 425.4

[56] References Cited
UNITED STATES PATENTS

| 3,156,274 | 11/1964 | Golick | 143/158 X |
|---|---|---|---|
| 195,626 | 9/1877 | McDonough | 143/157 C |
| 2,372,699 | 4/1945 | Wiken et al. | 143/158 UX |
| 189,613 | 4/1877 | Dicey | 143/158 UX |
| 2,533,704 | 12/1950 | Zanetti | 143/164 UX |

FOREIGN PATENTS OR APPLICATIONS

| 633,499 | 2/1962 | Italy | 143/157 C |

Primary Examiner—Andrew R. Juhasz
Assistant Examiner—James F. Coan
Attorney—Brian J. Wood

[57] ABSTRACT

Apparatus and method for cooling and lubricating collar and saw mounted on an edger arbor. Arbor has bore connected with valves mounted in arbor or in keys secured to arbor, valves being opened when in register with collar; valves not in register remain closed. Collar has manifolds and passages communicating with opened valve, and has grooves adjacent saw surfaces. Liquid in arbor bore passes through opened valve into collar, then to both saw surfaces for lubrication after cooling eye of saw and arbor.

13 Claims, 15 Drawing Figures

Patented Aug. 7, 1973

Patented Aug. 7, 1973 3,750,503

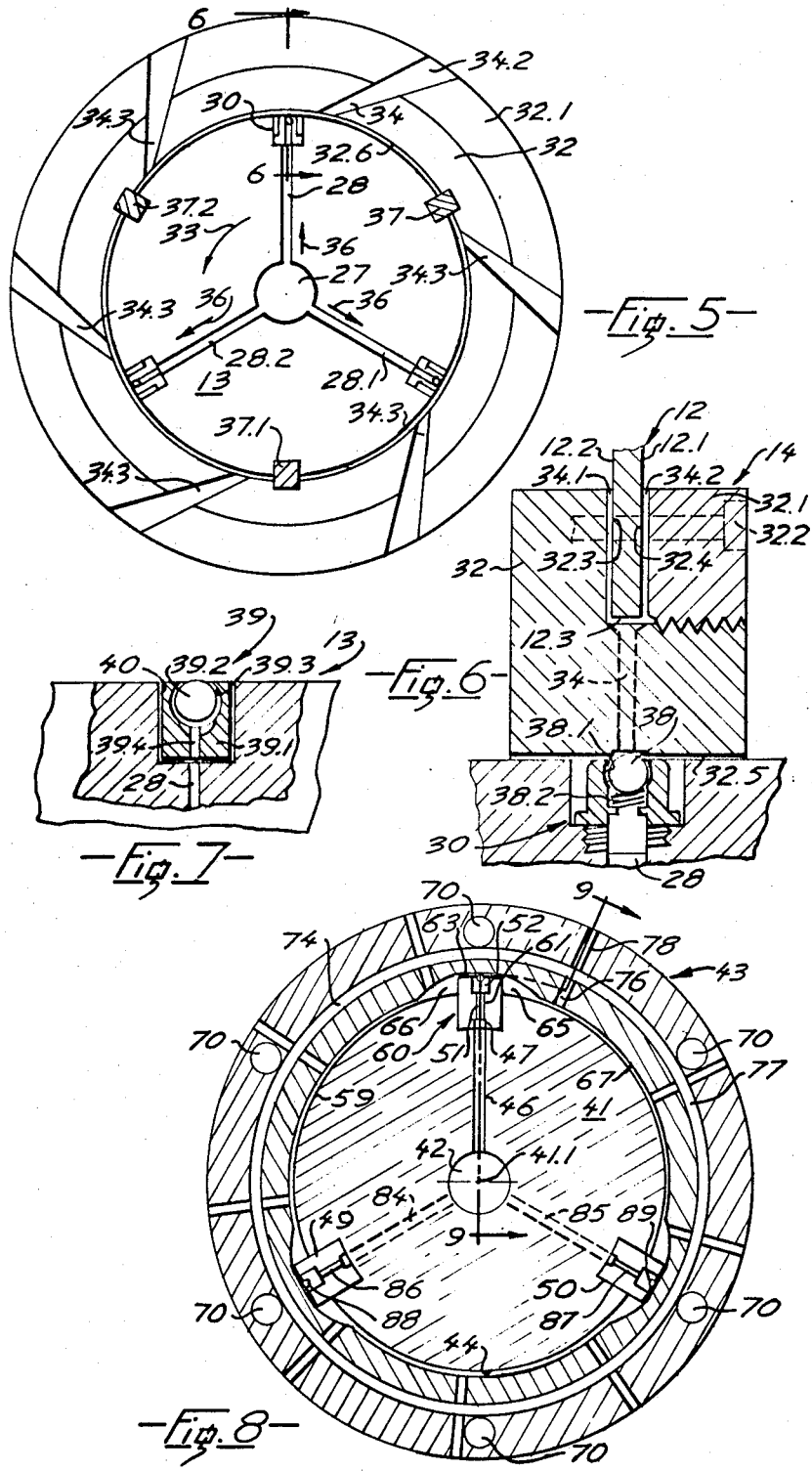

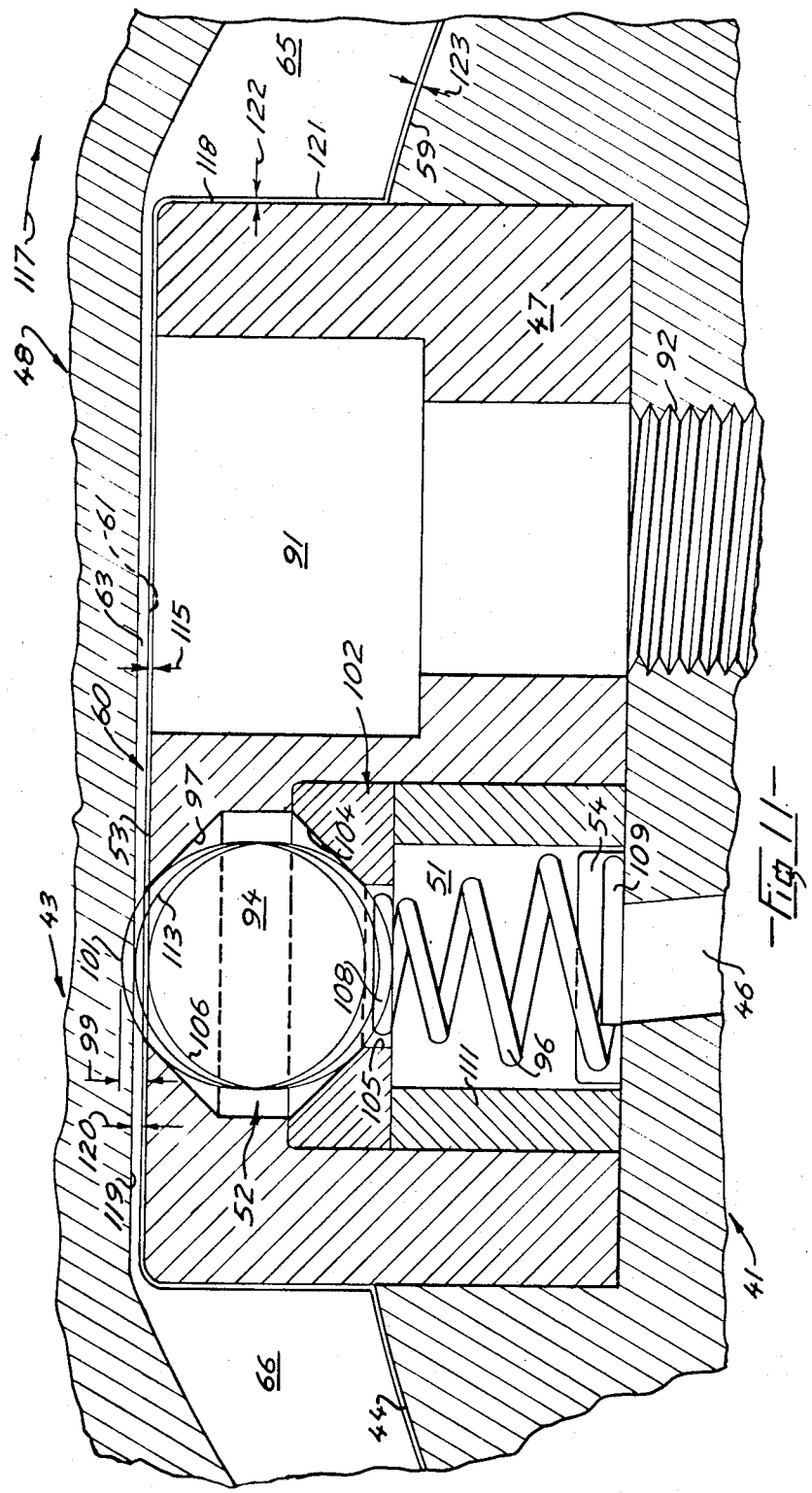

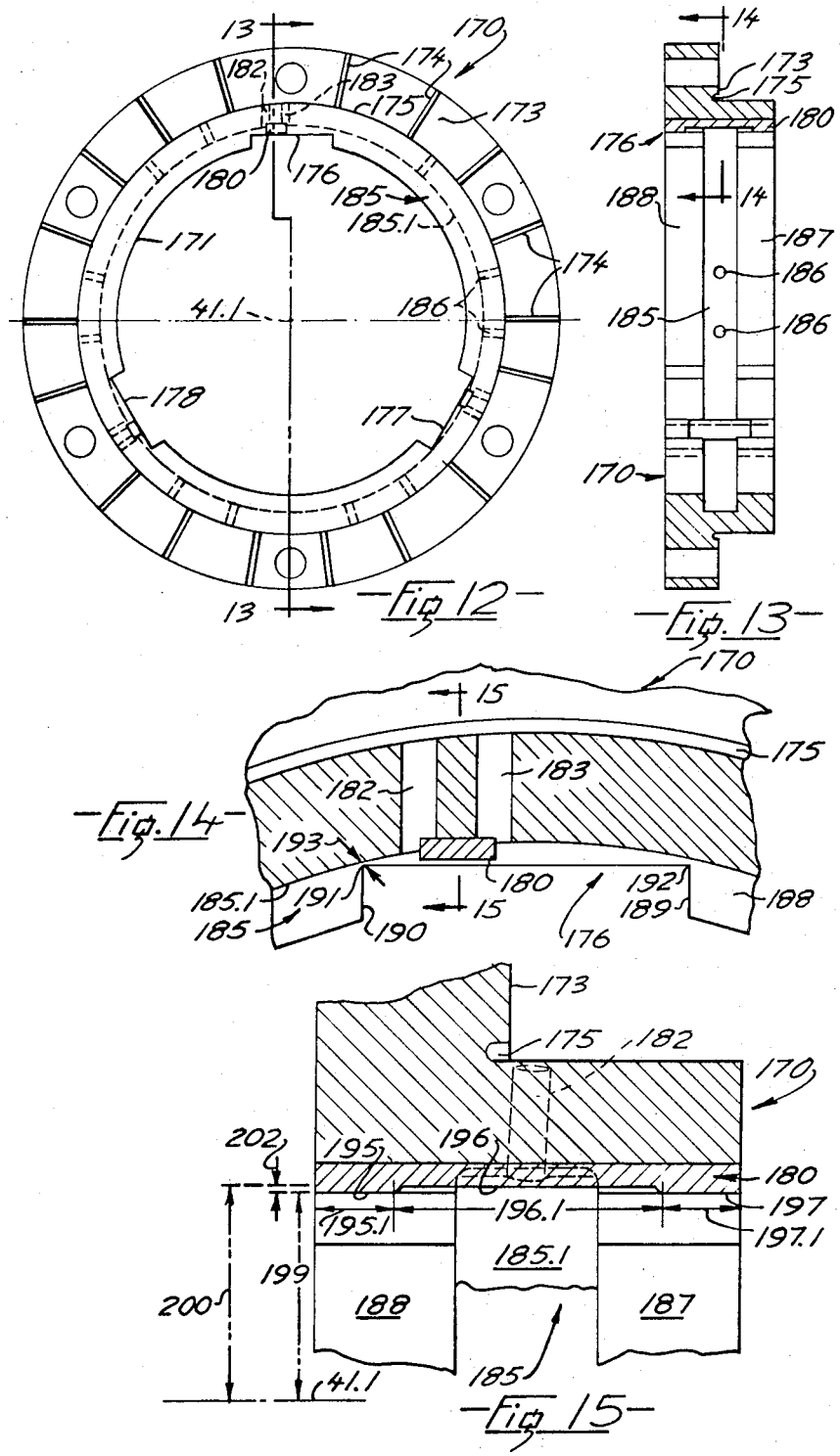

METHOD AND MEANS OF GANG SAW LUBRICATION AND COOLING

BACKGROUND OF THE INVENTION

1. Field of the Invention

The invention relates to improvements in sawmill machinery, and more particularly to improvements in cooling and lubrication means for circular saws used as gang saws in edgers.

Nomenclature

Terminology as below listed is used herein.

Flitch — A timber with parallel sawn top and bottom surfaces and waney edges.

Cant — A sawn timber produced for instance by removing the waney edges from a flitch, the cant being re-sawn to produce dimensional stock.

Gang saw — A series of co-axial circular saws on a common drive shaft or arbor, spacing between individual saws of the gang often being variable.

2. Prior Art

Commonly, circular saws are lubricated and cooled by spraying liquid on both surfaces of the blade at about mid-radius position, which liquid can tend to flood the blade. Both cooling and lubrication are used for optimum operation of saws, herein liquid refers to any suitable known coolant/lubricant - and can include a mist of droplets of the liquid.

Edgers usually have two or more blades, each mounted on a collar, the blades being spaced apart on the arbor as a gang saw, spacing being dependent on required dimensions of lumber being produced. Since the saw rotates at a high speed, liquid on the surface of the blade flies outwards due to centrifugal force. The liquid does not reach the arbor carrying the saw and increasing volume flow rate of liquid does not aid materially.

Spacing between adjacent blades is changed by moving a blade guide assembly associated with each saw. A saw is shifted axially on the arbor by guide plugs in the assembly being forced against one face of the saw, moving the saw and its collar. To reduce kerf losses, saws are thin and thus prone to breakage, and friction between the collar and arbor can be sufficient to break a saw during shifting. Keys secured longitudinally of the arbor engage keyways of the collar and are used to transmit drive to the saw.

When a circular saw cuts through lumber, flexing of the saw occurs from causes such as, variations in the lumber being cut, slight lateral movements of the lumber, and vibrations of the machine. The blade has a central eye and is secured to the collar and such flexing as above tends to heat the saw blade adjacent the eye and also to heat the collar. Since the liquid does not reach the eye of the saw blade, heat is removed slowly from the collar, so that the collar and blade operate at a high temperature which reduces their operating life. Thus blade failure at the eye is not unusual.

SUMMARY OF THE INVENTION

The invention provides a means of supplying liquid to the collar and to the eye of the saw, thus cooling the collar and saw and providing lubricant to facilitate axial shifting of the collar.

Liquid is centrifuged outwards from the eye of each saw across both saw blade surfaces. The liquid passes through a central bore in the arbor and is transmitted from the bore through passages to valves spaced axially along and adjacent the arbor.

The valves are opened and closed by the collar, the valve being fitted in one of two locations. The saw shifts axially of the arbor and, in moving to a particular station to be in register with a particular valve, opens that valve to pass liquid to both saw blade surfaces, other ball valves being closed.

A first location of the valve is where the valves are fitted directly in the arbor and two types of ball valves can be used. A first type is screwed directly into the arbor, requiring a large hole but this type limits spacing of the valves and drilling of radial feed passages weakens the arbor. The second type is either soldered or bonded to the shaft and permits closer spacing without material weakening of the arbor. Valves at each station are fed from radial passages extending from the central bore, and therefore at least one radial feed passage is required at each blade station, weakening the arbor when the stations are closely pitched. The valve is a two position ball valve, normally closed in a raised position, but can be lowered and opened by the collar when in register with the collar.

A second location of the valves is in an axial key secured to the arbor. Longitudinal grooves extend the length of the key and supply liquid to the valves spaced along the key at closely spaced intervals. A defective valve can be easily replaced by removing the key from the arbor. Longitudinal feeding of liquid along the key reduces the number of radial passages required in the arbor from the number required when the valves are in the first location. The valve is a three-position ball valve which operates as follows. The valve is closed when the ball is in raised or lowered position and open when in a middle position.

A detail description related to the drawings following gives exemplification of apparatus and method according to the present invention which, however, can be expressed in method and in structure other than that particularly described and illustrated.

DESCRIPTION OF THE DRAWINGS

FIG. 5 is a simplified fragmented detail section on 5—5 of FIG. 4, FIG. 6 is a simplified fragmented detail section on 6—6 of FIG. 5, FIG. 7 is a simplified fragmented detail section of an alternative valve used on the arbor, FIG. 8 is a section of a first alternative arbor and collar assembly as used for valves in a second location, viewed along a longitudinal axis on the arbor, the saw being removed, FIG. 11 is a simplified fragmented section at an enlarged scale of a ball valve on 11—11 of FIG. 9, FIG. 12 is a section of an alternative collar as viewed along a longitudinal axis of the arbor, arbor and saw being removed, FIG. 13 is a section on 13—13 of FIG. 12, FIG. 14 is a detail section on 14—14 of FIG. 13, FIG. 15 is a detail section on 15—15 of FIG. 14.

DETAIL DISCLOSURE

Figure 1:
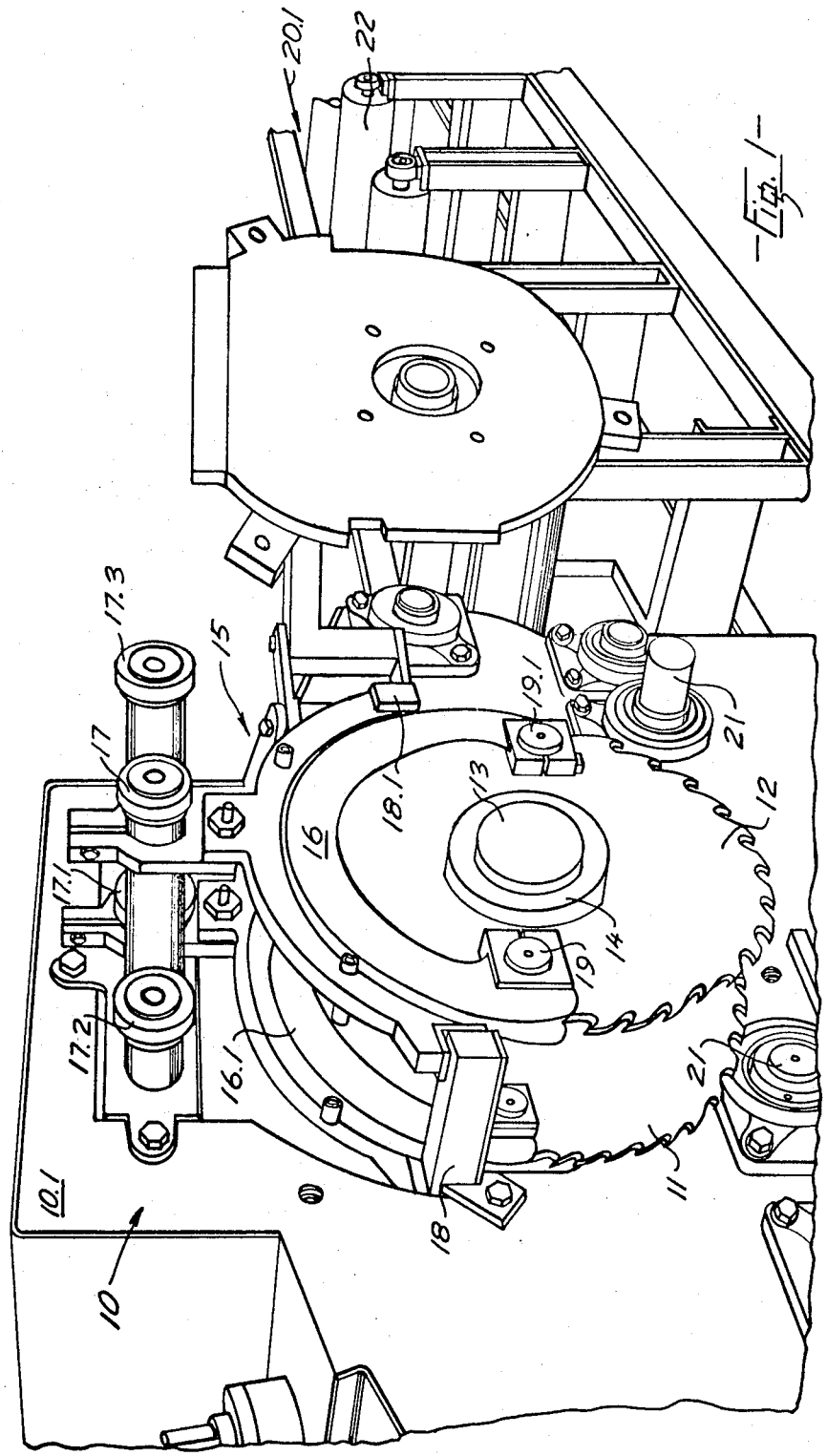
FIG. 1 is a perspective of an edger having a two saw gang.
Figure 2:
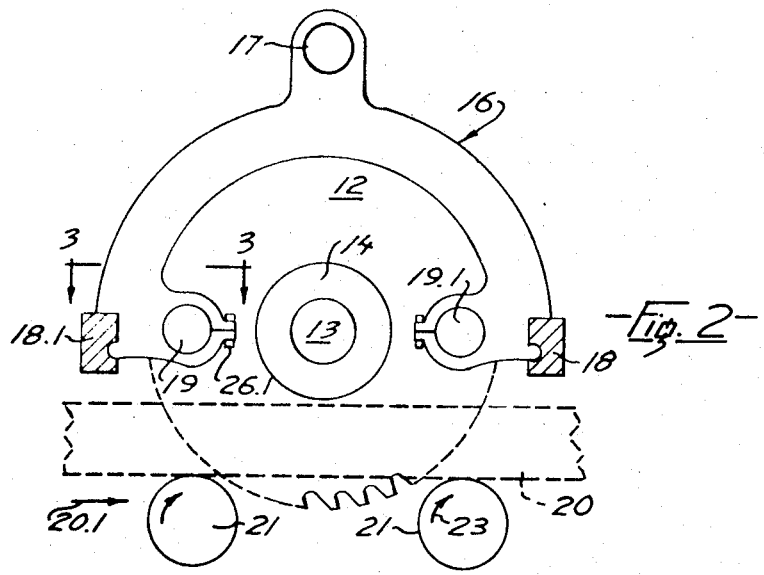
FIG. 2 is a simplified fragmented side elevation of an edger saw assembly viewed along an axis of an arbor.
Figure 3:
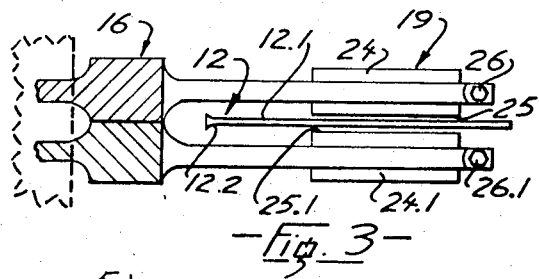
FIG. 3 is a simplified fragmented detail section on 3—3 of FIG. 2.

FIGS. 1 and 2

An edger generally 10, having a housing 10.1 has two circular saw blades 11 and 12 mounted for rotation on an arbor 13 by a collar 14. A blade guide assembly generally 15 is mounted above the blades, and has blade guide holders 16 and 16.1 secured to supports 17 and 17.1 which extend from the housing 10.1 as shown. Two further supports 17.2 and 17.3 are provided for use if required, but as shown are not carrying guide holders.

Steadies 18 and 18.1 extend outwards from the housing 10.1 and support the blade guide holders 16 and 16.1 as shown. A guide plug pair 19 is provided at a lower end of the guide holder 16 and a guide plug pair 19.1 is provided at an opposite end of the holder 16. In FIGS. 1 and 2 one guide plug only of each guide plug pair is seen. The holder 16.1 has similar guide plug pairs (not shown) and lumber, for instance a flitch 20 (FIG. 2 only in broken outline) passing through the edger moves in a direction shown by an arrow 20.1, passing over conveyor rolls severally 21. Feed rolls 22 pass the flitch through the saw blades producing a cant. The conveyor and feed rolls rotate in a direction shown by arrows 23 (FIG. 2 only).

FIG. 3

The blade 12 is mounted between the guide plug pair 19, the plug pair including two plugs 24 and 24.1 spaced oppositely to each other on either side of the blade 12 which blade has saw blade surfaces 12.1 and 12.2. The plugs have faces 25 and 25.1 respectively, which faces are spaced from the surfaces 12.1 and 12.2 of the blade by a controlled clearance, typically five thousandths of an inch the clearance being adjustable by pitch bolts 26 and 26.1, the means 26.1 being best seen in FIG. 2.

To change a position of the blade 12 on the arbor, the blade guide holder 16 is moved longitudinally along the support 17, one guide plug of each guide plug pair 19 and 19.1 contacting the blade 12 and moving it, with the collar 14, to a different station on the arbor.

Figure 4:
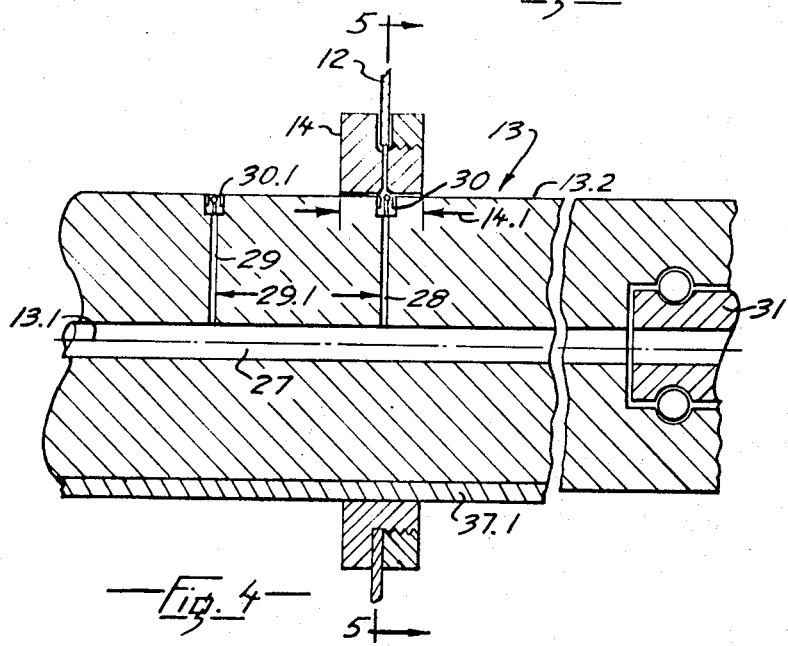
FIG. 4 is a simplified fragmented axial section on a diameter of a portion of an arbor showing passages to a collar and saw, for valves used in a first location.

FIG. 4 First location of valves

The arbor 13 rotates about an axis 13.1, and only a portion of the arbor is described in detail. The arbor 13 has an outer surface 13.2 and a central bore 27 concentric with the axis 13.1. Longitudinally spaced radial passages 28 and 29 extend to the outer surface 13.2, the passages having valves 30 and 30.1 respectively which close the passages when required. Each valve has a ball which is urged against a valve seat to close the valve, depression of the ball by a collar or other means opening the valve. The collar 14 is shown in register with the valve 30 which is thus open and the valve 30.1 is clear of the collar and is closed.

Liquid enters the bore 27 through a rotary seal assembly 31 at an end of the valve, leaving the bore through the passages with opened valves. The rotary seal is a means of supplying liquid under pressure to the central bore. Hereinafter where a saw secured to a collar is in register with a particular ball valve at a station on the arbor, that ball valve is termed the corresponding ball valve for that station, and ball valves spaced nearest to and on either side of the collar are termed adjacent ball valves.

FIGS. 5 and 6, with references to FIG. 4

The collar 14 has a main support ring 32 and a locking ring 32.1 threaded onto the inner ring 32, with screw means 32.2 (broken outline) used as conventional saw retaining means.

The arbor rotates in a direction shown by an arrow 33. The saw 12 has an eye having a side wall 12.3 which fits on the ring 32, the saw being gripped between opposed annular jaws 32.3 and 32.4 of the rings 32 and 32.1 respectively. A connecting passage 34 (broken outline in FIG. 6) extends outwards from an inner wall 32.5 of the ring 32 and communicates with the passage 28 through the valve 30 and an annular groove or manifold 32.6 in the wall 32.5. A shallow groove 34.1 in the jaw 32.3 of ring 32 and a shallow groove 34.2 in the jaw 32.4 of the securing ring 32.1 communicate with the passage 34 and extend radially outwards. These grooves are about half an inch wide and ten thousandths of an inch deep and serve to transmit liquid from the passage 34 to both surfaces of the saw blade. Clearly other means of providing clearance between the jaws and blade surfaces would suffice.

The annular groove 32.6 on the inner wall 32.5 extends circumferentially around the wall 32.5 and serves as a means of transmitting liquid from the radial passage 28 to a plurality of connecting passages 34.3 similar to the connecting passage 34. Each connecting passage 34.3 transmits liquid to shallow grooves similar to the grooves 34.1 and 34.2. The annular manifold 32.6 is about ten thousandths of an inch deep by about one half an inch wide. The annular manifold, the passages 34 and 34.3, and the grooves in the jaws serve as distribution means to supply liquid from the valve to both surfaces of the saw.

As seen in FIG. 5, the bore 27 communicates with three radial passages, one passage 28 as described, and two further similar passages 28.1 and 28.2 spaced at 120°. The passages 28.1 and 28.2 have valves similar to the valve 30 which are opened concurrently with the valve 30. Liquid flow through the passages 28, 28.1, and 28.2 is designated by arrows 36, which liquid, after passing the opened valves, enters the annular groove 32.6 and is distributed circumferentially, leaving the collar through the passages 34 and 34.3 and the shallow grooves. The passage 28, and the valve 30 serve as transfer means to conduct liquid from the bore to the collar.

Liquid is thus transmitted to both surfaces of the saw at many positions around the eye of the saw, the liquid leaving the collar and being centrifuged outwards to the teeth of the saw. In some operating conditions, one radial passage only, namely the passage 28, suffices to supply liquid to the collar. The arbor has provision for carrying several blades, one blade at each station on the arbor, each station being provided with one or more passages similar to the passage 28, each passage being equipped with a valve similar to valve 30. Blade stations are provided on the arbor at a spacing sufficient to produce a cant of desired width. Such spacing between adjacent stations is at standard increments, usually about 2 inches, and for each station not provided with a saw blade, the valve remains closed. Thus, liquid is not passed at stations on the arbor not carrying saws, reducing waste of liquid.

With reference to FIG. 4, it is to be noted that the collar has an axial width 14.1 of less than twice axial separation 29.1 between adjacent ball valves to prevent interference between the collar and adjacent ball valves thus preventing inadvertent opening on the adjacent valves. Thus axial spacing between adjacent valves is greater than one half of the axial width of the collar.

Flow through the valve is dependent on many factors, main factors being delivery pressure of liquid to the bore 27, viscosity of the liquid, clearance through the valve, the rotational speed of the shaft, and size and number of the passages and grooves but is sufficient to maintain cooling and lubrication of the arbor, collar and saw blade.

Longitudinally extending keys 37, 37.1 and 37.2 are spaced around the arbor 13 and engage keyways in the collar and serve as a means of transmitting power to the collar while providing longitudinal adjustment for spacing of the saws when changing to a different saw spacing. The radial passages 28.1 and 28.2 are additional to the passage 28 to supply liquid to the portion of the annular groove 32.6 that may become starved of liquid due to restriction of flow by the keys. Small longitudinal movements of the collar relative to the arbor in the order of a few thousandths of an inch takes place during cutting, such longitudinal movements reducing bending of the saw by permitting the saw to attain a position of minimal stress for any particular cutting conditions. Liquid for cooling the arbor serves also to lubricate the collar and arbor easing such small longitudinal movements. The liquid also lubricates both surfaces of the saw blade, reducing friction between the saw and guide plug pairs, the plugs having wear resistance and low coefficient of friction.

With reference to FIG. 6, the valve 30 is a common ball valve in which the ball 38 is urged against a valve seat 38.1 by a coil spring 38.2. The valve is screwed into a threaded hole in the arbor and communicates with the passage 28. When depressed by the collar, the ball moves radially inwards off the valve seat 38.1, permitting flow of liquid through the valve.

FIG. 7

In an edger requiring many blade stations, because a common ball valve has a relatively large diameter and length relative to the diameter of the the arbor, if such valves are spaced at a 2 inch pitch along the arbor, holes for the valves may dangerously weaken a long arbor. Thus, an alternative smaller valve can be substituted for the common ball valve.

An alternative valve 39, has a body 39.1 having a ball 39.2 fitted in a spherical recess having a valve seat 39.3. The body 39.1 is fitted in a bore 40 in he arbor 13, which bore is materially smaller than the bore for the valve 45, thus reducing weakening effect of valves in the arbor. The body 39.1 can be soldered or bonded to the bore 40, thus eliminating threads. A valve bore 39.4 connects the spherical recess with the radial passage 28, admitting liquid into the spherical recess and to the ball, pressure of which liquid forces the ball against the valve seat closing the valve. Centrifugal force on the ball 39.2 produced when the shaft rotates augments seating of the ball against the valve seat, improving closure of the bore 39.4 The ball is depressed inwards by the collar to open the valve as before.

OPERATION OF FIRST EMBODIMENT

FIGS. 1 through 7

Liquid under pressure from a pump (not shown) is delivered to the rotary seal assembly 31, through the seal into the bore 27, from where, by passages similar to the passages 28, it is distributed to stations on the arbor provided with saw blades. For the blade 12, the collar 14 depresses the ball of the valve 30 permitting liquid to enter the annular manifold 32.6 from the passage 28. The manifold 32.6 transmits liquid circumferentially around the arbor, the liquid leaving the manifold through the passage 34 and 34.3, exhausting at the eye of the saw. The liquid leaves the collar through the shallow grooves 34.1 and 34.2 supplying liquid at points circumferentially spaced around the collar on both side of the blade. The liquid is centrifuged outwards on both saw blade surfaces to tips of the saw, reducing friction and wear between the guide plugs, after lubricating small longitudinal movements between the collar and the arbor. Passage of liquid through the collar around the eye of the saw removes heat produced by flexing of the saw, thus maintaining the saw at a reasonable temperature, and increasing life of the saw. Life of the saw is also increased by lubricating the small longitudinal movements of the collar relative to the arbor produced by sliding of keys in the keyways of the collar, as the saw continuously adjusts itself responding to changes in cutting conditions.

FIRST ALTERNATIVE EMBODIMENT

Figure 9:
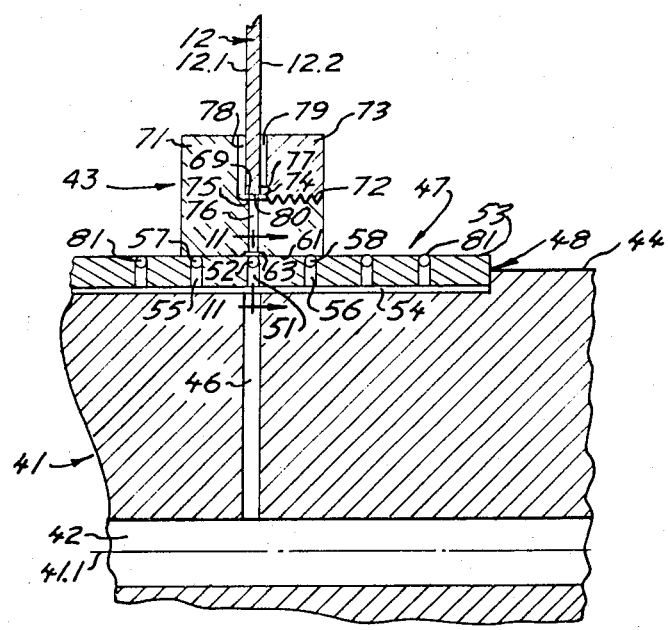
FIG. 9 is a simplified fragmented section on 9—9 of FIG. 8, a portion of the saw being shown.

FIGS. 8, 9 and 11. Second Location of Valve

An alternative arbor and collar assembly is used in instances where finer adjustment of saw spacing than that obtained in the first distributor is required. Also, difficulty of replacement of ball valves bonded or soldered into the arbor is eliminated in the alternative embodiment to be described.

FIGS. 8 and 9

An alternative arbor 41 has an axis 41.1 and a central bore 42 fed with liquid under pressure from a rotary seal assembly (not shown). The arbor 41 has an outer surface 44 and carries an alternative collar 43 mounting the saw blade 12. A radial passage 46 extends from the bore 42, to a longitudinal key generally 47 secured in a longitudinal keyway 48 of the arbor 41. As seen in FIG. 8, two further similar keys 49 and 50 are provided spaced 120° apart.

With reference to FIG. 9, a longitudinal groove or manifold 54 is provided between the key 47 and a lower wall of the keyway 48, the groove serving as an axial manifold for longitudinal distribution of liquid, being later described in detail with reference to FIG. 11. A passage 51 extends through the key 47 and communicates with the groove 54, the passage being provided with a ball valve 52 adjacent an outer surface 53 of the key 47. Two similar adjacent passages 55 and 56 are spaced equally on either side of the passage 51 and have two similar ball valves 57 and 58. A plurality of similar passages each provided with a ball valve are pitched equally along the key 47 to outer limits of movement of the saws, pitching being closer than the embodiment of FIGS. 4 through 7. The keys 49 and 50 are similar. The passage 46, the axial manifold 54, the passage 51 and valve 52 serve as transfer means to conduct the liquid from the bore 27 to the collar.

With reference to FIG. 8, the alternative collar 43 has a bore having a side wall 59, and three keyways to accept the keys 47, 49, and 50, each key being a sliding fit to its keyway, thus permitting longitudinal movement of the collar relative to the arbor. One keyway 60 in the collar complementary to the key 47 has an inner wall 61, with a shallow transverse groove 63 (best seen in FIG. 9) communicating with transfer grooves 65 and 66 of either side of the keyway. The groove 63 has a depth of typically of fifteen thousandths of an inch, and width of about three-quarters of an inch. When the collar is aligned with the corresponding ball valve, the groove 63 communicates with the passage 51, transmitting liquid from grooves 65 and 66 as is later described with reference to FIG. 11. The transfer grooves communicate with an annular groove or manifold 67 in the bore side wall 59 of the collar, shown in broken outline in FIG. 8 only, extending circumferentially around the collar 43 and communicating with corresponding transfer grooves associated with the keys 49 and 50. The groove 67 is also suitably ten thousandths of an inch deep and three-quarters of an inch wide, and provides a means of distributing liquid to radial passages extending from the bore of the collar through the collar later described.

As seen in FIG. 9, the collar 43 has a main support ring 71 being an L-sectioned annulus provided with a threaded portion 72 which accepts a locking ring 73. Set screws, severally 70, secure the locking ring and saw 12, jaws on the rings 71 and 73 gripping the saw blade.

The saw has an eye 75 which is a snug fit on a cylindrical boss portion 69 of the ring 71. When secured to the ring 71, the locking ring has an annular groove 74 adjacent an inner portion of the saw surface 12.2 thus forming an annular passage or manifold 77 (FIG. 8) adjacent the eye 75 of the saw.

A radial passage 76 in the ring 71 extends outwards from the shallow annular groove 67 and communicates with the annular manifold 77. An annular groove 80 in the boss 69 extends through the eye of the saw and connects the annular passage 77 with the surface 12.1 of the saw. Thus both surfaces of the saw are supplied with liquid from the passage 76 - further grooves similar to the groove 80 are spaced around the boss 69. Liquid is fed to the eye of the saw through a plurality of similar radial passages (shown here in broken outline) extending from the groove 67 to the eye of the saw. Radial grooves 78 and 79 cut in the jaws of the rings 71 and 73 extend from the annular passage at the eye of the saw to the outer surface of the arbor and supply liquid from the annular passage to the saw blade surfaces 12.1 and 12.2. A plurality of grooves similar to the grooves 78 and 79 extend from the annular groove 74 at positions spaced circumferentially at about 30° around the collar 43. The grooves are provided in the surfaces of the rings 71 and 73 adjacent surfaces 12.1 and 12.2, and depth of the grooves is in the order of ten thousandths of an inch and width suitably one quarter of an inch. Rotation of the saw, due to centrifugal force, augments any residual pressure in the liquid that has not been metered out by the various constrictions in its flow from the central bore 42.

In FIG. 9 the ball valve 52 is opened by the collar as described with reference to FIG. 11, the valve passing liquid from the passages 46 and 51 via the transfer groove 65 and the annular groove 67 to the passage 76.

The ball of the valve 52 is in a middle open position and the balls of the two adjacent ball valves 57 and 58 are held in a lowered closed position by outer portions of the collar 14, thus no liquid is passed. Additional ball valves, designated severally 81, are provided along the key 47 and are in a raised closed position, as will be described with reference to FIG. 11. Thus all ball valves are closed apart from the valve 52 and corresponding valves in the keys 49 and 50, which valves pass liquid at a rate of flow sufficient to lubricate sides 12.1 and 12.2 of the saw blade, while cooling the collar and eye of the saw.

With reference to FIG. 8 two further radial passages 84 and 85 (shown in broken outline) extend from the central bore 42 to the bores 86 and 87 in the keys 49 and 50, to supply liquid to ball valves 88 and 89 in the keys 49 and 50. The radial passages are axially spaced along the arbor and are not within a plane normal to the axis 41.1 and containing the passage 46, thus weakening of the arbor is less than that in the embodiment of FIGS. 4 through 7, other factors being unchanged. The valves 88 and 89 function similarly to the valve 52.

FIG. 11

The ball valve 52 is adjacent a set screw 91 in a threaded hole 92 in the arbor. The key 47 is secured to the arbor by a plurality of similar screws provided along the key, the key having as shown sufficient width to accept, at one station, the ball valve and the set screw. A narrower key can be used if the set screws and ball valves are staggered.

The radial passage 46 communicates with the longitudinal groove or axial manifold 54 extending the length of the key and connecting each ball valve of one key with the passage 46. Other means of connecting the ball valves can be provided, for example a groove cut in the keyway 48 of the arbor.

The ball valve 52 has a ball 94, suitably stainless steel, the ball being urged outwardly of the arbor by a compression spring 96, having a generally truncated conical shape as shown. An upper portion of the passage 51 is partially closed by an outer valve seat 97, the valve seat permitting the ball, when unrestricted by the collar, to stand proud of the outer surface 53 of the key by a distance 99, in the order of about thirty thousandths of an inch. When standing proud as above, the ball is in the raised closed position, designated 101 and shown in full outline, the passage 51 being closed to flow of liquid.

An annular valve seat element 102 provides an inner valve seat 104, spacing between the inner and outer valve seats being such as to permit the ball 94 to move axially of the passage 51 about thirty thousandths of an inch, so that when the ball 94 is forced to a lowered closed position 106 by the collar, an outer portion of the ball is flush with the surface 53 of the key. The element 102 has a bore 105 to pass liquid when the valve 52 is open, and the spring 96 has an upper end 108 contacting the ball 94 and a lower end 109 adjacent the keyway 48. The seat element 102 is formed of a relatively resilient material such as neoprene or nylon, and is designed to flex a few thousandths of an inch sufficient to permit a reasonable tolerance on variations in bore diameters and surface variations of the walls 61 of the keyway 60.

The valve seat element 102 is secured in place by a tube 111 which is a tight fit in the bore of the passage 51, and also serves to maintain concentricity of the lower end 109 of the spring 96 with the bore 51. The tube 111 also supports the seat against excessive deflection, deflection force being dependent on depression of the ball.

The valve 52 is open when the ball 94 is in a middle open position designated 113, in which position liquid from the passage 51 flows transversely across the key 57 in the groove 63 into the transfer grooves 65 and 66. The ball 94 in the open position 113 passes an amount of liquid dependent on clearances between the valve seats and the ball, viscosity of the liquid, and pressure under which it is supplied to the ball. The shallow groove 63 is cut into the surface of the keyway to a depth 120 which, as aforesaid is, in the order of fifteen thousandths of an inch, the groove having a wall 119. The depth 120 provides for clearance for fluid to flow transversely across the key and also depresses the ball 94 to the open position i.e. fifteen thousandths of an inch from the raised position, which position is critical, as material variation from the open position in either direction will tend to reduce flow of liquid into the groove 63. Thus the middle open position of the ball is a maximum flow position. Liquid passes around the ball through clearances provided between the valve seat and the ball. Accumulation of tolerances and arbor/collar bore clearances in one direction may tend to displace the ball from the middle open position and use of a resilient lower seat element increases allowable tolerances in this respect.

If the arbor rotates in a direction shown by an arrow 117, a driving face 118 of the key 47 contacts a driven face 121 of the collar. This driving condition is not shown in FIG. 11 — the key being in a mid-position in the keyway with equal distribution of clearances — thus not transmitting power. The face 121 is divided by the transfer groove 65 and has a total net width of about two thirds of the width of the collar, the difference in widths being accounted for by the width of the transfer groove 65. There is clearance 115 between the keys 47 and the keyway 60 and a similar clearance 123 between the bore sidewall 59 of the collar and the outer surface 44 of the arbor. The clearances are typically about two or three thousandths of an inch. This is to permit sliding of the collar on the keyways for changing spacing between saws and for permitting entry of liquid to aid in such sliding. Clearance between the faces 118 and 121, designated 122, is shown in a mid-way condition, being half total circumferential key/keyway clearance.

OPERATION OF SECOND EMBODIMENT

FIGS. 8, 9, and 11

When the saw is in operation, the bore 42 is subjected to a liquid under pressure and the radial passages 46, 84, and 85 transmit the liquid to the keys. The longitudinal groove 54 distributes liquid along the key 47 and past the ball 94 of the valve 52 which is in the open position, being partially depressed by the wall 119 of the groove 63. Liquid passes along the groove 63 and transfer grooves 65 and 66 to reach the passage 76 and similar passages, which passages feed liquid to the eye of the saw from where it is centrifuged outwards on both sides of the saw. The balls in the valves 57 and 58 are in the lowered closed position, being pressed against the inner valve seats by the wall 61 of the keyway. Balls of the valves clear of the collar are urged by spring and liquid forces against the upper valve seats into the raised closed position, so that there is not material leakage.

THIRD EMBODIMENT

FIG. 10

An alternative three position ball valve 130 is fitted in an alternative key 131, being alternative to the valve 52 and the key 47 of FIG. 9. The alternative ball valve simplifies the construction of the key by providing a separate outer valve seat integral with the valve seat which permits greater variation in manufacturing tolerances.

An alternative ball valve 130 is fitted in an alternative key 131 secured to the arbor 41 as before described, similar ball valves being spaced along the key similarly to the ball valves 52, FIG. 9. The valve has a cylindrical valve casing 133 secured as a push fit in a bore 134 in the key 131. The bore 134 communicates with the radial passage 46 in the arbor as previously described. Valve has a ball 132 urged against an outer valve seat face 135 of an outer valve element 136. An inner valve element 139 has an inner valve seat 140, and an O-ring seal 142 encircles the element 139, reducing leakage of liquid between the casing 133 and the element 139.

A washer 144 is retained at an inner end of the casing 133 and an outer coil spring 145 extends between the element 139 and the washer 144, urging the element 139 radially outwards to bear against the element 136, which serves as a stop.

A valve plunger 148 having a bore 150 is urged radially outwards by an inner coil spring 151, encircled by the outer spring 145, shoulders 153 on the plunger 148 restricting movement of the plunger relative to the valve seat element 139. An outer end of the plunger has a conical seat 155 adapted to engage the ball 132, clearance grooves 157 being provided in the seat 155 to permit liquid from the bore 150 to flow transversely across the conical seat 155.

The ball 132 has three positions similar to the ball 94, FIG. 11, namely a raised closed position 159 (full line), a middle open position 160 (broken outline) and a lowered closed position 161 (broken outline). Similarly to the ball 94 FIG. 11, in the raised closed position 159 the ball is forced outwards against the outer valve seat 135 by the inner coil spring 151 forcing the plunger 148 outwards against the ball. When depressed by the collar, the ball is moved inwards to the middle open position 160 and the plunger 148 slides radially inwards, permitting flow of liquid through the clearance grooves 157 and radially outwards through the outer valve element 136.

In the lowered closed position 161, the ball 132 is approximately flush with the outer surface 131.1 of the key and is urged against the inner valve seat 140 which seat can, if required, also move radially inwards by compressing the outer spring 145. The seat 140 has a hardened face, as opposed to the inner valve seat 104, FIG. 11, which has a resilient face. Spring mounting of the inner valve element 139 provides sufficient resiliency to accommodate manufacturing tolerances that occur in the clearance between the collar bore and the key face 131.1 functioning similarly to the resilient seat element 102 of FIG. 11. Similarly to the key 47, FIG. 11, an axial groove 163 extends along the key serving as an axial manifold to distribute liquid to adjacent keys when required.

FIGS. 12 and 13

An alternative collar 170 is adapted for use on the arbor 41 (not shown) the axis 41.1 of which is shown relative to the collar. The arbor 170 is provided with wear resisting inserts to reduce a tendency of the ball valve to wear a groove across the collar due to axial sliding of the collar. The collar 170 is also provided with dual passages from the ball valve to increase flow to the eye of the saw.

The collar 170 has an inner cylindrical surface 171 adapted to slide on the arbor and an annular jaw 173 adapted to contact one blade surface of the saw (not shown). The annular jaw 173 has grooves 174 similar to the grooves 78 and 79 of FIG. 8, which grooves extend radially from the eye of the saw. The cylindrical surface 171 has three similar spaced keyways 176, 177, and 178, the keyway 176 only being described. The keyway 176 has a hard anvil 180, suitably a tungsten carbide insert bonded to the collar, the anvil being adapted to contact the ball of the ball valve. The anvil is spaced between two passages 182 and 183 (broken outline), which passages serve the same function as the passage 76 (FIG. 8), that is to transfer liquid from the ball valve to the eye of the saw. An annular groove 175 (best seen in FIGS. 14 and 15) communicates with the radial passage 174 in the jaw 173 and is adjacent the eye of the saw when the saw is clamped in the collar.

An annular manifold 185 is provided around the surface 171 of the collar (broken outline) and has a depth sufficient to clear keys in the keyway (not shown), so as to distribute liquid circumferentially to further passages 186, similar to the passages 182 and 183, thence to the groove 175. The annular manifold 185 is straddled by flanges 187 and 188, which flanges (best seen in FIG. 13 and 15) support the collar against rocking and provide drive faces 189 and 190 for the key to transmit power to the collar.

FIGS. 14 and 15

With reference to FIG. 14, the keyway 176 has corners 191 and 192 which accept corners of the key (not shown). The corners are spaced from he manifold wall 185.1 by a clearance dimension 193 of the order of about fifteen thousandths of an inch, sufficient to pass liquid passed by the ball valve (not shown) circumferentially from the key into the annular manifold 185 thence to the adjacent passages 186. Such circumferential distribution as above ensures a supply of liquid at positions adjacent the eye of the saw circumferentially spaced from the three keyways.

Figure 10:
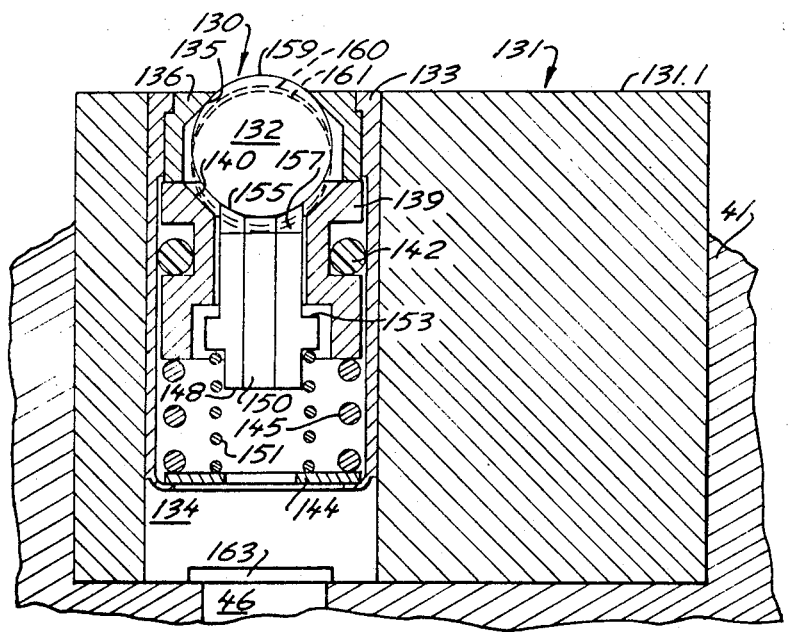
FIG. 10 is a ball valve alternative to the valve shown in FIG. 11.

With reference to FIG. 15, the anvil 180 is a precision fit in the collar as radial separation of the anvil from the axis 41.1 determines the distance the ball of the ball valve is depressed. The anvil has three working surfaces 195, 196, and 197 which surfaces have axial dimensions 195.1, 196.1, and 197.1. Outer surfaces 195 and 197 are radially spaced from the axis 41.1 of the arbor at a radial dimension 199, which dimension is sufficient to depress the ball to the lowered closed position 161 (FIG. 10) when the collar is in register with an adjacent valve. Inner working surface 196 is radially spaced from the axis 41.1 by a radial dimension 200 which dimension is sufficient to depress the ball to the middle open position so as to open the valve to pass liquid to the passage 182. Difference 202 in the radial dimensions 199 and 200 is about twenty thousandths of an inch, which is approximately equal to the difference of ball positions relative to the key from the middle open position 160 to the lowered closed position 161 (FIG. 10). Thus the anvil functions similarly to portions of the collar as shown in FIG. 11. Radii are provided at junction of the working surfaces of the anvil 180 to reduce wearing or indentation of the ball of the ball valve when it contacts the anvil, which is considerably harder than the ball.

The annular manifold 185, the passages 182 and 183, the annular groove 175, and radial grooves 174 serve as distribution means in the collar to supply liquid to the blade surface of the saw.

OPERATION OF THIRD EMBODIMENT

FIGS. 10 and 12 through 15

With reference to FIG. 10 the alternative ball valve 130 has a ball 132 that functions similarly to the ball 94 of the ball valve 52 (FIG. 11). When the collar is clear of the ball valve, the ball is in the raised closed position 159 and fluid does not flow through the passage 46. When the collar is in register with the ball valve 130, the ball is pushed to the middle open position 160, pushing the plunger 148 inwards about twenty thousandths of an inch, liquid passing from the passage 46, through the washer 144 and bore 150, through the clearance grooves 157 around the ball and out to the annular manifold 185 of the collar. When the collar is in register with a ball valve adjacent to the valve 130, the surface 195 or 197 of the anvil (FIG. 15) contacts the ball and pushes it to the lowered closed position 161 in which the ball seats against the inner valve seat 140, thus closing the valve. If required, the inner valve element 139 is deflected inwards slightly by depressing the spring 145, thus reducing any damage to the ball due to excessive accummulation of tolerances.

With reference to FIG. 12 the alternative collar 170 functions similarly to the collar 43 of FIG. 8, the anvil 180 resisting wear and affording closer control of depression of the ball. The anvil 180 contacts the ball in one of two positions. In one position, when the collar is in register with an adjacent ball valve the anvil pushes the ball to the lowered closed position 161 in which the ball contacts one of the working surfaces 195 or 197 of the anvil. In a further position, when the collar is in register with the valve 130 the ball contacts the working surface 196, the ball being pushed to the middle open position, pushing the plunger 148 inwards, the liquid passing from the valve, through the passage 182, 183 or into the annular manifold 185.

Clearly the ball valve 52 of FIG. 11 can be used in conjunction with the alternative collar 170, and the valve 130 can be used with the collar 43 of FIG. 8.

SIMPLIFIED ALTERNATIVE EMBODIMENT

All embodiments as described in FIGS. 1 through 15 show a gang saw arbor in which the saws are slidable axially to produce cants of different widths. In such an embodiment, a valve is provided at each station at which the saw might be placed, there being provision for opening and closing the valve to pass liquid when required.

Clearly in a simplified arrangement where there is no requirement for axial sliding of the collars, the valves spaced along the arbor can be eliminated to produce a simplified embodiment in which the central bore in the arbor feeds liquid directly to fixed collars on the arbor. This eliminates valves, other transfer means being provided between the arbor and the collar. This embodiment is not illustrated. Passages and annular manifolds in the collar similar to those described provide access to both sides of the saw for liquid from the arbor. This eliminates the complexity of the valves as described, but would limit the edger to produce cants of a fixed width.

However the advantages of the invention, which advantages include cooling of the arbor, cooling of the eye of the saw, and lubrication of the arbor and collar for small relative axial movements that occur during sawing would still be attained. Likewise substantially complete lubrication and cooling of both saw blade surfaces would be attained, improving over existing edgers.

I claim:

1. In an edger having; an arbor having a bore and being adapted to carry a collar; the collar having an axial width and opposed jaws adapted to engage blade surfaces of a saw for securing the saw to the collar; the arbor, collar, and saw being adapted for mutual rotation; blade guiding means
straddling the saw; and means to feed lumber through the saw; means to lubricate and cool the collar and saw including:
   a. supply means to feed liquid under pressure to the bore of the arbor,
   b. transfer means to conduct liquid from the bore to the collar, the transfer means including;
      i. a valve adjacent the arbor, the valve being normally closed when clear of the collar, and opened when in register with the collar, so as to pass liquid to the collar,
      ii. the arbor having a passage leading from the bore of the arbor to the valve to conduct liquid from the bore to the valve,
   c. distribution means in the collar communicating with the valve so that when the valve is opened by the collar, liquid in the passage passes the valve into the distribution means, constructed and arranged so that when the arbor rotates the saw to cut lumber, liquid is fed in to the bore and passes outwards to the valve in register with and opened by the collar, the liquid passing the valve and flowing to the blade surfaces of the saw across which the liquid is centrifuged, the liquid providing coolant and lubricant for the collar and the saw.

2. An edger as defined in claim 1 in which the supply means is a rotary seal assembly adjacent an end of the arbor.

3. An edger as defined in claim 1 in which:
   f. the valve is adjacent an outer surface of the arbor, the valve being a two-position valve and having a raised closed position when the valve is clear of the arbor, and a lowered open position when the valve is in register with the arbor,
   g. axial spacing between adjacent valves along the surface of the collar being greater than one-half of the axial width of the collar so as to prevent interference between the collar and adjacent valves,
adapted so that when the collar is in register with a corresponding valve the corresponding valve is opened and liquid flows from the bore into the collar, remaining valves being closed.

4. An edger as defined in claim 1 in which:
   h. a key having a surface extends axially along the arbor and is in sliding engagement with a keyway in the collar so as to transmit power to the collar,
   i. the valve is a three-position valve and is adjacent the surface of a key, the valve having a raised closed position when the valve is clear of the collar, a middle open position when the collar is in register with the valve, and a closed lowered position when the collar is in register with an adjacent valve,
so that, when the collar is in register with a corresponding valve, the corresponding valve is opened and liquid flows from the bore into the collar, remaining valves and valves adjacent to the collar being closed.

5. An edger as defined in claim 4, including:
   j. an axial manifold extending along the key to distribute liquid axially to valves spaced along the key.

6. An edger as defined in claim 1 in which the distribution means in the collar includes:
   k. the collar cooperating with the arbor to form an annular manifold to distribute liquid circumferentially about the collar, the annular manifold communicating with the transfer means,
   l. clearance between the jaws of the collar and the saw, the clearance communicating with the annular manifold,
adapted so that liquid from the bore of the arbor fed to transfer means is distributed circumferentially around the collar and is centrifuged outwards across surfaces of the saw, providing lubricant for the saw.

7. An edger as defined in claim 1 in which
   m. the collar is slidable axially of the arbor so as to change position of the saw relative to the arbor, the saws being moved by the blade guiding means.

8. An edger as claimed in claim 6 in which
   n. the annular manifold extends circumferentially around a bore in a side wall of the collar adjacent the arbor, the manifold communicating with opened valves,
   o. the collar has passages extending from the annular manifold to the clearance between the jaws of the collar and the saw to conduct liquid from the annular manifold to the surfaces of the saw.

9. An edger as claimed in claim 4 in which the three-position valve is adapted selectively to open and close a passage in the key, and the valve includes:
   p. a ball being moveable axially of the passage, a spring urging the ball outwards of the passage,
   q. an outer valve seat at an outer end of the passage, the seat permitting the ball to stand proud of the surface of the key in the raised closed position, when the collar is clear of the valve, the ball being urged against the seat to close the valve,
   r. an inner valve seat, spacing between the valve seats permitting limited movement of the ball, the inner valve seat being resilient and positioned so that when the collar is in register with an adjacent valve the ball is forced against the inner valve seat by the collar to the lowered closed position to close the valve, the ball being essentially flush with the outer surface of the key,
the passage of the valve having a size such that, when the collar is in register with the valve, the ball is depressed by the wall of the collar to the middle open position which provides clearance for liquid to flow around the ball into the distribution means of the collar.

10. An edger as claimed in claim 4 in which the three-position valve is adapted selectively to open and close a bore in the key, the valve including:
   s. a ball being moveable axially of the bore, t. an outer valve seat face at an outer end of the bore which permits the ball to stand proud of the surface of the key in the raised closed position when the collar is clear of the valve, u. an inner valve element having an inner valve seat, spacing between the valve seats limiting movement of the ball, the inner valve element being spring urged outwards to bear against a stop so that when the ball is in the lowered closed position the ball is urged against the inner valve seat to close the valve, the seat element being resiliently mounted to accommodate variation in clearance between bore of the collar and the key, v. a valve plunger having an outer face to engage the ball, the plunger being spring urged outwards to force the ball against the outer valve seat face to close the valve in the raised closed position, the plunger having clearance for flow of liquid past the plunger, the bore of the valve being a size such that when the collar is in register with the valve, the ball is depressed by the collar to the middle open position which provides clearance around the ball, 11. An edger as defined in claim 4 in which:

w. the collar has a keyway having a hard anvil adapted to contact the ball of the ball valve.

12. An edger as defined in claim 11 in which:

x. the anvil has outer working surfaces straddling an inner working surface, the inner surface being radially spaced from the arbor to depress the ball to the middle open position when the collar is in register with the valve, the outer working surfaces being spaced from the arbor to depress the ball to the lowered closed position when the collar is in register with an adjacent valve, y. the collar having a passage adjacent the anvil and communicating with the keyway to transmit liquid from the keyway to the saw.

13. A method of cooling and lubricating a collar and saw of an edger, the collar being mounted on an arbor for rotation, the saw being secured to the collar, the method including steps of:

a. supplying liquid under pressure to the arbor, discharge of liquid from the arbor being substantially prevented by closed valves, b. positioning the collar on the arbor so as to open at least one valve permitting transfer of liquid from the arbor to the collar, c. distributing liquid from the collar to surfaces of the blade, so as to cool and lubricate the collar and surfaces of the saw.

* * * * *